(12) United States Patent
Eguchi

(10) Patent No.: US 9,625,759 B2
(45) Date of Patent: Apr. 18, 2017

(54) COLOR FILTER SUBSTRATE, LIQUID CRYSTAL DISPLAY PANEL, AND LIQUID CRYSTAL DISPLAY DEVICE

(71) Applicant: Sharp Kabushiki Kaisha, Osaka (JP)

(72) Inventor: Makoto Eguchi, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 14/784,367

(22) PCT Filed: Feb. 26, 2014

(86) PCT No.: PCT/JP2014/054705
§ 371 (c)(1),
(2) Date: Oct. 14, 2015

(87) PCT Pub. No.: WO2014/174890
PCT Pub. Date: Oct. 30, 2014

(65) Prior Publication Data
US 2016/0062179 A1 Mar. 3, 2016

(30) Foreign Application Priority Data
Apr. 25, 2013 (JP) ................. 2013-092935

(51) Int. Cl.
| | | |
|---|---|---|
| G02F 1/1335 | (2006.01) |
| G02F 1/1343 | (2006.01) |
| H01G 9/20 | (2006.01) |
| G02F 1/1362 | (2006.01) |
| G02F 1/133 | (2006.01) |

(52) U.S. Cl.
CPC .... G02F 1/133514 (2013.01); G02F 1/13306 (2013.01); G02F 1/13439 (2013.01); G02F 1/133555 (2013.01); H01G 9/2068 (2013.01); G02F 1/1362 (2013.01); G02F 2001/13324 (2013.01); G02F 2201/40 (2013.01); G02F 2201/52 (2013.01); G02F 2202/04 (2013.01); H01G 9/2031 (2013.01); H01G 9/2059 (2013.01); Y02E 10/542 (2013.01)

(58) Field of Classification Search
CPC .......... G02F 1/133514; G02F 1/13306; G02F 1/133555; G02F 1/13439; H01G 9/20; H01G 9/2068
See application file for complete search history.

(56) References Cited

U.S. PATENT DOCUMENTS

| | | | |
|---|---|---|---|
| 6,310,282 B1 | 10/2001 | Sakurai et al. | |
| 2011/0096271 A1* | 4/2011 | Yoshida | ............ G02F 1/133528 349/96 |

FOREIGN PATENT DOCUMENTS

| | | |
|---|---|---|
| JP | 2000-268891 A | 9/2000 |
| JP | 2012-64550 A | 3/2012 |

* cited by examiner

Primary Examiner — James Dudek
(74) Attorney, Agent, or Firm — Chen Yoshimura LLP

(57) ABSTRACT

A dye-sensitized solar cell is formed on a substrate, and a coloring material pattern is formed on the substrate in an area different from an area where the dye-sensitized solar cell is disposed. The dye-sensitized solar cell includes a positive electrode and a negative electrode disposed facing one another, and a sensitizing dye adsorption layer and an electrolyte layer both formed between the positive electrode and the negative electrode. The coloring material pattern transmits wavelength components of light that differ from wavelength components of light transmitted by the sensitizing dye adsorption layer.

13 Claims, 8 Drawing Sheets

COLOR FILTER SUBSTRATE, LIQUID CRYSTAL DISPLAY PANEL, AND LIQUID CRYSTAL DISPLAY DEVICE

TECHNICAL FIELD

The present invention relates to a color filter substrate, a liquid crystal display panel, and a liquid crystal display device.

The present application claims the benefit of Patent Application No. 2013-092935 filed in Japan on Apr. 25, 2013, the entire contents of which are hereby incorporated by reference.

BACKGROUND ART

In recent years, development of liquid crystal display devices has been robust. The majority of these liquid crystal display devices are equipped with an active matrix-driven liquid crystal display panel.

More specifically, such liquid crystal display panels typically include a device substrate and an opposite substrate arranged facing one another and a liquid crystal layer sandwiched between the device substrate and the opposite substrate. On the surface of the device substrate facing the liquid crystal layer, a plurality of pixel electrodes are arranged in a matrix pattern.

Moreover, on the surface of the device substrate or the opposite substrate facing the liquid crystal layer, a plurality of color filter layers containing coloring materials (pigment or dye) in colors such as red (R), green (G), or blue (B) are arranged in a repeating pattern. These color filter layers are formed in regions known as pixel regions that overlap with the respective pixel electrodes when viewed in a plan view.

In a liquid crystal display device equipped with a transmissive liquid crystal display panel, white illumination light emitted from a backlight enters the liquid crystal display panel from the device substrate side. Furthermore, red light, green light, and blue light are emitted from the opposite substrate side of the liquid crystal display panel, thereby making it possible to display color images.

In such liquid crystal display panels, while it appears as though the color filter layers color the white illumination light emitted from the backlight, in reality the color filter layers simply transmit only certain wavelength components of the light according to the coloring materials used and absorb the other wavelength components. For example, the red color filter layers transmit the red wavelength components of the illumination light and absorb the other green and blue wavelength components.

Therefore, in such liquid crystal display panels, only a relatively small amount of the illumination light emitted from the backlight is actually used to display images, with most of the light not being used and going to waste. The amount of light that a liquid crystal display panel transmits relative to the total amount of illumination light from the backlight that originally enters the liquid crystal display panel is generally known as transmittance. The liquid crystal display panels used in mobile phones, for example, typically have a transmittance on the order of a few percent. The reason the transmittance of liquid crystal display panels is so low is because of this large amount of light that is absorbed by the color filter layers and not transmitted.

Moreover, the fact that the transmittance of such liquid crystal display panels is so low also means that much of the electrical power consumed to illuminate the backlight goes to waste.

To make use of this light that is not used to display images and would otherwise be wasted, liquid crystal display devices in which the color filter layers are made using dye-sensitized solar cells that convert the light absorbed by the color filter layers to electrical power have been proposed (see Patent Document 1, for example).

In dye-sensitized solar cells, sensitizing dye adsorption layers formed by adsorbing a dye (a sensitizing dye) into the surfaces of titanium dioxide particles and an electrolyte layer containing iodine are arranged between a positive electrode and a negative electrode, for example. Irradiating the dye-sensitized solar cell with light creates an electromotive force between the positive electrode and the negative electrode.

RELATED ART DOCUMENT

Patent Document

Patent Document 1: Japanese Patent Application Laid-Open Publication No. 2000-268891

SUMMARY OF THE INVENTION

Problems to be Solved by the Invention

However, when using dye-sensitized solar cells as color filter layers, the color of the light transmitted by the color filter layers is the color of the dye contained in the sensitizing dye adsorption layers. In addition, the options for dyes that can be used in the sensitizing dye adsorption layers are limited in comparison with the options for coloring materials that are normally used in color filter layers. Therefore, using dye-sensitized solar cells for the color filter layers makes color adjustment more difficult than when using color filter layers made using conventional coloring materials, and color reproduction suffers as a result.

The present invention was made in order to solve the abovementioned problems and aims to provide a color filter substrate in which color filter layers made using dye-sensitized solar cells exhibit improved color reproduction, as well as a liquid crystal display panel and a liquid crystal display device provided with the same.

Means for Solving the Problems

The present invention employs the following to achieve the abovementioned objective.

(1) A color filter substrate according to one aspect of the present invention includes: a substrate; a dye-sensitized solar cell disposed on the substrate; and a coloring material pattern disposed on the substrate in an area different from an area where the dye-sensitized solar cell is disposed, wherein the dye-sensitized solar cell includes a positive electrode and a negative electrode disposed facing one another, and a sensitizing dye adsorption layer and an electrolyte layer both formed between the positive electrode and the negative electrode, and wherein the coloring material pattern transmits wavelength components of light that differ from wavelength components of light transmitted by the sensitizing dye adsorption layer.

(2) In the color filter substrate according to (1), a plurality of pixels may be defined on the substrate, each pixel having the dye-sensitized solar cell and the coloring material pattern, the plurality of pixels may be grouped into a plurality of colored groups each assigned different colors, and the wavelength components transmitted by the sensitizing dye adsorption layer in the dye-sensitized solar cell in each pixel may differ each colored group, and the wavelength components transmitted by the coloring material pattern in each pixel may differ for each colored group.

(3) In the color filter substrate according to (2), may further include a ratio of an area of the dye-sensitized solar cell to an area of the coloring material pattern in each pixel differs for each colored group.

(4) In color filter substrate according to any one of (1) to (3), a portion of the sensitizing dye adsorption layer in the dye-sensitized solar cell in each of the pixels may be dyed black to shield the respective pixels from light.

(5) In the color filter substrate according to any one of (1) to (4), the positive electrode and the negative electrode may be transparent electrodes.

(6) A liquid crystal display panel according to one aspect of the present invention includes: a device substrate and an opposite substrate arranged facing one another; and a liquid crystal layer formed between the device substrate and the opposite substrate, wherein one of the device substrate and the opposite substrate is the color filter substrate according to any one of (1) to (5).

(7) A liquid crystal display panel according to one aspect of the present invention includes: a device substrate and an opposite substrate arranged facing one another; and a liquid crystal layer provided between the device substrate and the opposite substrate, wherein one of the device substrate and the opposite substrate is the color filter substrate according to (3), wherein a plurality of pixel electrodes are formed on a surface of the device substrate that faces the liquid crystal layer, and wherein the pixels are defined in the color filter substrate so as to overlap with the pixel electrodes, respectively, in a plan view.

(8) In the liquid crystal display panel according to (7), the pixel electrodes may be transparent electrodes.

(9) In the liquid crystal display panel according to (7), the pixel electrodes may be reflective electrodes.

(10) In the liquid crystal display panel according to (7), each of the pixel electrodes may have a transmissive portion and a reflective portion.

(11) In the liquid crystal display panel according to (10), one of either the coloring material pattern or at least a portion of the sensitizing dye adsorption layer of the dye-sensitized solar cell may be formed in a transmissive region that overlaps with the transmissive portion of the pixel electrode in a plan view, and the other of either the coloring material pattern or at least the portion of the sensitizing dye adsorption layer may be formed in a reflective region that overlaps with the reflective portion of the pixel electrode in a plan view.

(12) In the liquid crystal display panel according to (10), each pixel may have at least two of the coloring material patterns and at least two of the sensitizing dye adsorption layers, one of the coloring material patterns and at least a portion of one of the sensitizing dye adsorption layers may both formed in a transmissive region that overlaps with the transmissive portion of the pixel electrode in a plan view, and another of the coloring material patterns and at least a portion of another of the sensitizing dye adsorption layers may be both formed in a reflective region that overlaps with the reflective portion of the pixel electrode in a plan view, and a ratio of a region in which the sensitizing dye adsorption layer of the dye-sensitized solar cell is formed to a region in which the coloring material pattern is formed in the transmissive regions may be different than a ratio of a region in which the sensitizing dye adsorption pattern is formed to a region in which the coloring material pattern is formed in the reflective region.

(13) A liquid crystal display device according to one aspect of the present invention includes: the liquid crystal display panel according to any one of (6) to (12); and a power source that supplies electrical power to the liquid crystal display panel, wherein the dye-sensitized solar cell supplies electrical power to at least the power source.

(14) A liquid crystal display device according to one aspect of the present invention includes: the liquid crystal display panel according to any one of (6) to (8) or (10) to (12); and a light source that irradiates the liquid crystal display panel with illumination light, wherein the dye-sensitized solar cell supplies electrical power to at least the light source.

Effects of the Invention

As described above, in one aspect of the present invention, the color filter layers of the present invention include both sensitizing dye adsorption layers and coloring material layers which can be used to adjust the colors of light transmitted by the color filter layers. Therefore, the present invention makes it possible to improve the color reproduction of color filter layers made using dye-sensitized solar cells.

DETAILED DESCRIPTION OF EMBODIMENTS

Next, embodiments of the present invention will be described with reference to figures. Note that in the attached figures, the dimensions and relative scale of some of the components illustrated have been altered to make those components easier to see.

<Embodiment 1>

Figure 1:
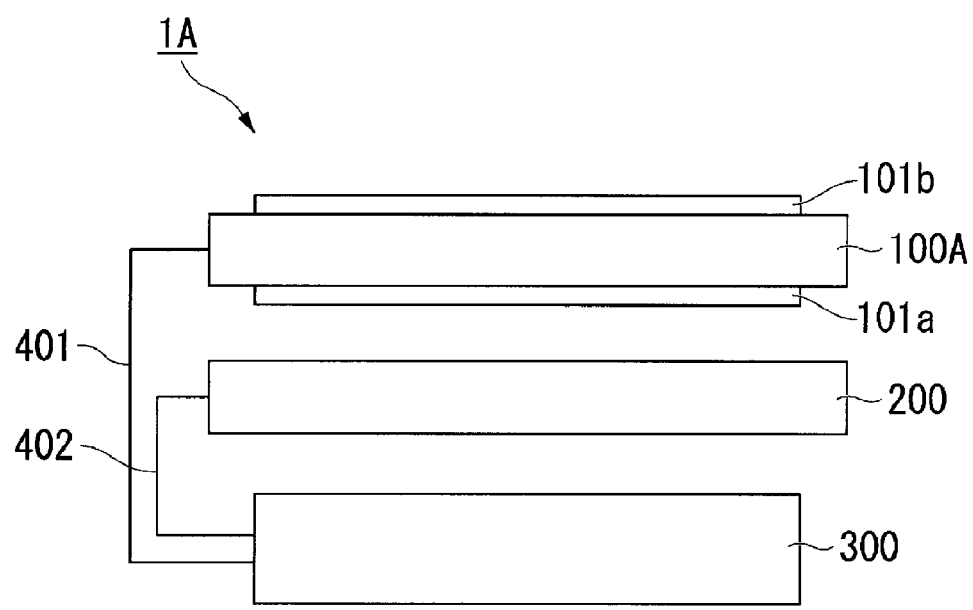
FIG. 1 schematically illustrates a configuration of a liquid crystal display device according to Embodiment 1 of the present invention.

FIG. 1 schematically illustrates a configuration of a liquid crystal display device 1A according to Embodiment 1 of the present invention.

As illustrated in FIG. 1, a liquid crystal display device 1A includes a transmissive liquid crystal display panel 100A, a backlight 200 that serves as a light source and irradiates the liquid crystal display panel 100A with illumination light WL, and a battery 300 that serves as a power source and supplies power to the liquid crystal display panel 100A and the backlight 200. Furthermore, polarizing plates 101a and 101b are provided on the light-receiving surface side and light-exiting surface side, respectively, of the liquid crystal display panel 100A.

Figure 2:
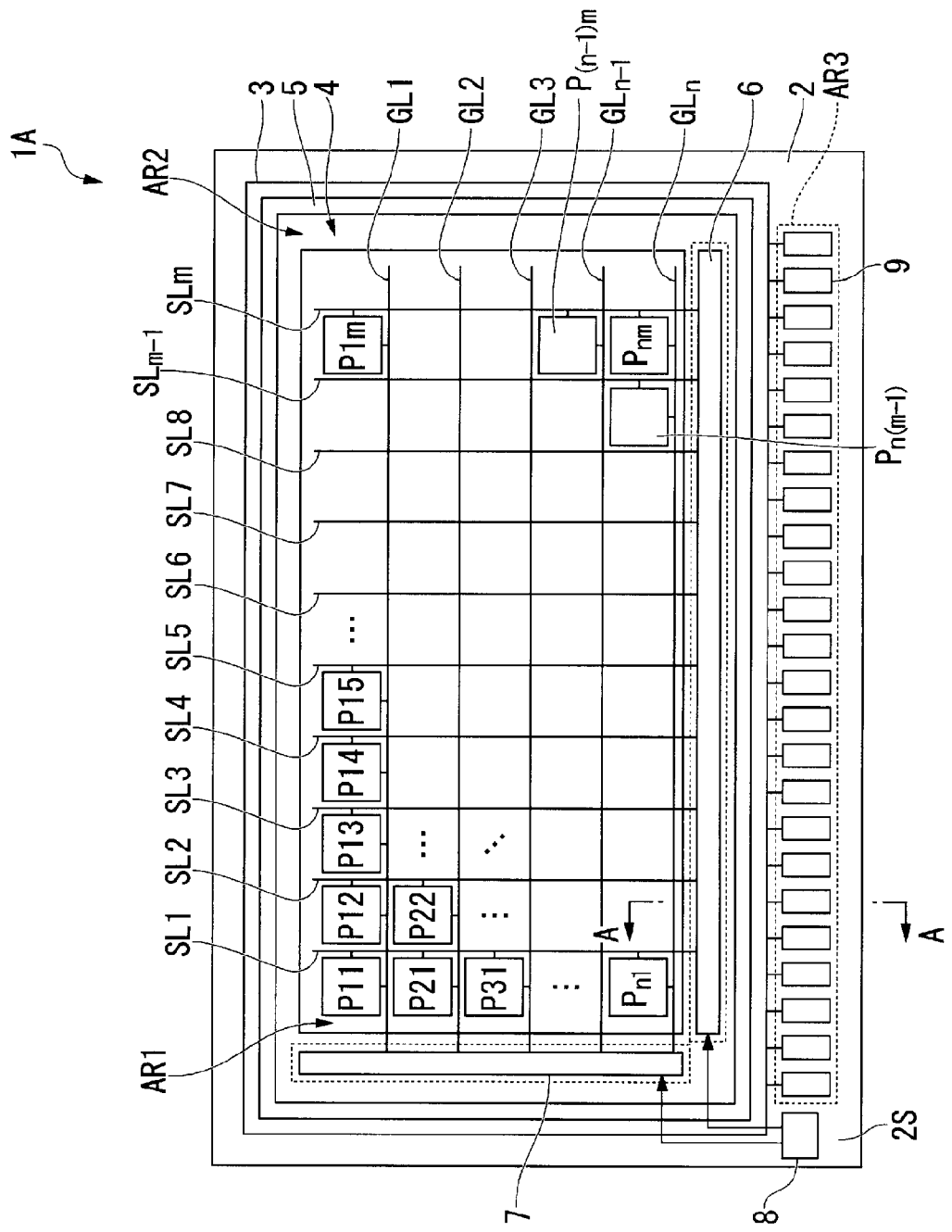
FIG. 2 is a plan view schematically illustrating a configuration of the liquid crystal display panel illustrated in FIG. 1.
Figure 3:
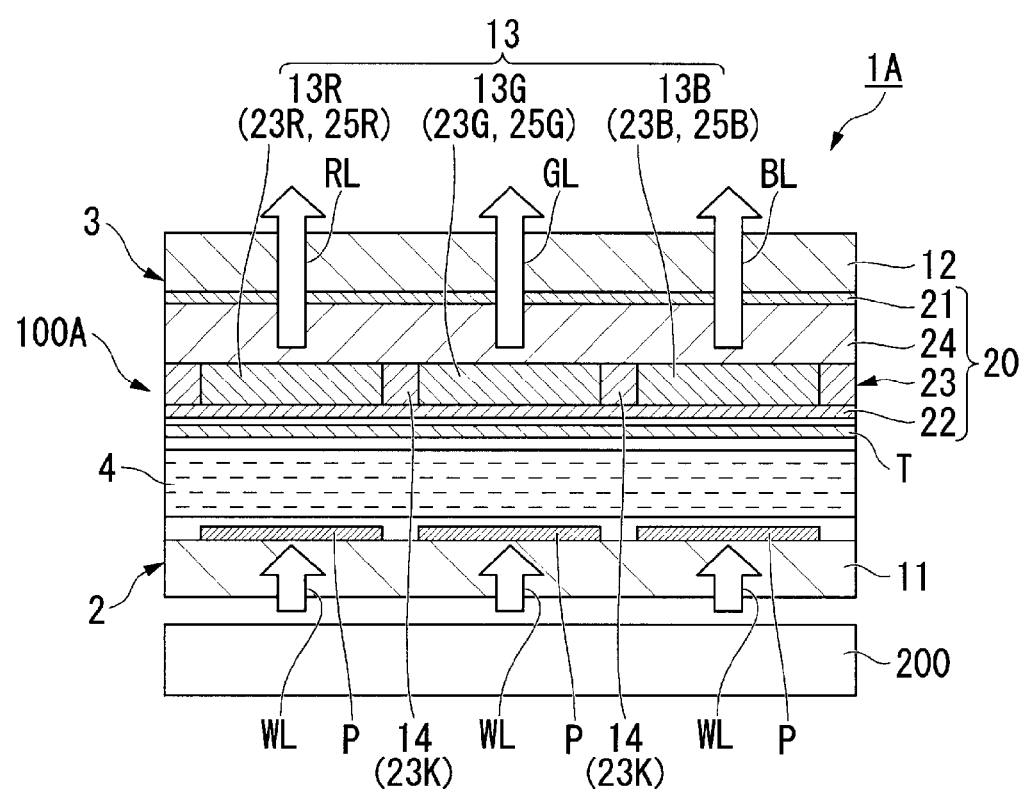
FIG. 3 is a cross-sectional view schematically illustrating a configuration of the liquid crystal display panel illustrated in FIG. 1.

FIG. 2 is a plan view schematically illustrating a configuration of the liquid crystal display panel 100A. FIG. 3 is a cross-sectional view (taken along line A-A in FIG. 2) schematically illustrating a configuration of the main components of the liquid crystal display panel 100A.

As illustrated in FIGS. 2 and 3, the liquid crystal display panel 100A includes a device substrate 2 and an opposite substrate 3 arranged facing one another and a liquid crystal layer 4 sandwiched between the device substrate 2 and the opposite substrate 3.

In the liquid crystal display panel 100A, a sealing material 5 is formed between the device substrate 2 and the opposite substrate 3 around the peripheries thereof, and liquid crystal is injected into that sealed region to form the liquid crystal layer 4 that is sandwiched between the device substrate 2 and the opposite substrate 3.

Spacers (not illustrated in the figure) are formed within the liquid crystal layer 4 in order to maintain a prescribed gap between the device substrate 2 and the opposite substrate 3. Alignment films (not illustrated in the figure) that align the liquid crystal molecules in the liquid crystal layer 4 are formed on the surfaces of the device substrate 2 and the opposite substrate 3 that contact the liquid crystal layer 4.

On the surface of the device substrate 2 that faces the liquid crystal layer 4, a display region AR1 that is rectangular when viewed in a plan view and a peripheral region AR2 that has a rectangular frame shape around the display region AR1 when viewed in a plan view are formed.

In the display region AR1 of the device substrate 2, a plurality of source bus lines SL1 to SLm, a plurality of gate bus lines GL1 to GLn, and a plurality of switching elements (not illustrated in the figure) are formed. Note that in the following description, the plurality of source bus lines SL1 to SLm are referred to collectively as "the source bus lines SL", and the plurality of gate bus lines GL1 to GLn are referred to collectively as "the gate bus lines GL".

The source bus lines SL are arranged side-by-side and running parallel to one another in a first direction (the vertical direction of the liquid crystal display panel 100A as illustrated in FIG. 2). The gate bus lines GL are arranged side by side and running parallel to one another in a direction orthogonal to the first direction (the horizontal direction of the liquid crystal display panel 100A as illustrated in FIG. 2). Moreover, the source bus lines SL and the gate bus lines GL do not necessarily have to be mutually orthogonal. The source bus lines SL and the gate bus lines GL may also intersect with one another at an angle other than 90°.

In the display region AR1 of the device substrate 2, a plurality of pixel electrodes P11 to Pnm are arranged in a matrix pattern. Each pixel electrode P11 to Pnm is arranged within one of the rectangular regions in the lattice pattern formed by the source bus lines SL and the gate bus lines GL. Note that in the following description, the plurality of pixel electrodes P11 to Pnm are referred to collectively as "the pixel electrodes P."

The pixel electrodes P are transparent electrodes formed using a transparent conductive material such as indium tin oxide (ITO) or indium zinc oxide (IZO), for example.

The switching elements (not illustrated in the figures) are thin film transistors (TFT), for example. One TFT is formed at each intersection between the source bus lines SL and the gate bus lines GL. Furthermore, the source electrodes of the TFTs are electrically connected to the respective source bus lines SL, the drain electrodes of the TFTs are electrically connected to the respective pixel electrodes P, and the gate electrodes of the TFTs are electrically connected to the respective gate bus lines GL.

In the peripheral region AR2 of the device substrate 2, peripheral circuits such as a source driver 6 and a gate driver 7 are formed. The source driver 6 and the gate driver 7 are arranged inside the region formed by the sealing material 5.

The source driver 6 is arranged running in the direction in which the source bus lines SL are arranged side by side (that is, the horizontal line direction). One of the ends of each of the source bus lines SL is electrically connected to the source driver 6.

The gate driver 7 is arranged running in the direction in which the gate bus lines GL are arranged side by side (that is, the vertical line direction). One of the ends of each of the gate bus lines GL is electrically connected to the gate driver 7.

The device substrate 2 is larger than the opposite substrate 3 when viewed in a plan view. The sealing material 5 is formed running around the periphery of the opposite substrate 3 and has a rectangular frame shape when viewed in a plan view. The device substrate 2 and the opposite substrate 3 are fixed together by the sealing material 5.

On the outer side of the region formed by the sealing material 5, the device substrate 2 protrudes out from the opposite substrate 3 and forms a protruding region 2S. A control circuit 8 and a plurality of terminals 9 are formed on the protruding region 2S.

The control circuit 8 sends control signals for displaying images to the source driver 6 and the gate driver 7. Control signals sent to the source driver 6 include source start pulses (SSP), source shift clock signals (SSC), source output enable signals (SOE), and polarity control signals (POL), for example. Control signals sent to the gate driver 7 include gate start pulses (GSP), gate shift clock signals (GSC), and gate output enable signals (GOE), for example.

The gate driver 7 sequentially sends scanning signals to the gate bus lines GL1 to GLn in order from GL1 to GL2, GL3, . . . , GLn. These scanning signals drive the switching elements on a horizontal line basis.

The source driver 6 converts the received image signals to analog image signals. During each horizontal scanning period in which a scanning signal is sent to one of the gate bus lines GL, the source driver 6 sends one horizontal line's worth of image signals to the source bus lines SL1 to SLm.

The terminals 9 are arranged side by side in a region that runs in the horizontal line direction (a terminal region AR3). These terminals 9 are electrically connected to the source driver 6 and the gate driver 7.

A substrate such as a glass substrate that is transparent to light (a transparent substrate) 11 is used as the device substrate 2, for example. The device substrate 2 includes the pixel electrodes P, the switching elements, the peripheral circuits (source driver 6 and gate driver 7), the control circuit 8, the terminals 9, and the like that are all provided on the surface of the transparent substrate 11 that faces the liquid crystal layer 4.

A substrate such as a glass substrate that is transparent to light (a transparent substrate) 12 is used for the opposite substrate 3, for example. On the surface of the transparent substrate 12 of the opposite substrate 3 that faces the liquid crystal layer 4, a common opposite electrode T that faces the pixel electrodes P is formed. The opposite electrode T is a transparent electrode formed using a transparent conductive material such as ITO or IZO, for example.

The opposite substrate 3 corresponds to the color filter substrate of the present invention. In other words, on the surface of the opposite substrate 3 that faces the liquid crystal layer 4, a color filter layer 13 that includes a dye-sensitized solar cell layer 20 is formed.

The color filter layer 13 includes red color filter layers 13R that transmit red light RL, green color filter layers 13G that transmit green light GL, and blue color filter layers 13B that transmit blue light BL, for example. These color filter layers 13R, 13G, and 13B are arranged side by side in a repeating pattern, for example.

The red color filter layers 13R, the green color filter layers 13G, and the blue color filter layers 13B are formed in a regions known as pixel regions that overlap with the respective pixel electrodes P when viewed in a plan view.

The dye-sensitized solar cell layer 20 includes a sensitizing dye adsorption layer 23 and an electrolyte layer 24 arranged between a positive electrode 21 and a negative electrode 22, for example. Irradiating the dye-sensitized solar cell layer 20 with light creates an electromotive force between the positive electrode 21 and the negative electrode 22. In the present embodiment, the positive electrode 21, the electrolyte layer 24, the sensitizing dye adsorption layer 23, and the negative electrode 22 are layered in that order on the surface of the opposite substrate 3 that faces the liquid crystal layer 4.

The positive electrode 21 and the negative electrode 22 are transparent electrodes formed using a transparent conductive material such as ITO or IZO, for example. As illustrated in FIG. 1, the positive electrode 21 and the negative electrode 22 are electrically connected to the power supply circuit of the backlight 200 and to the battery 300 via wires 401 and 402.

The sensitizing dye adsorption layer 23 is made from a highly porous thin film in which a dye (a sensitizing dye) is adsorbed onto the surfaces of titanium dioxide ($TiO_2$) particles, for example. A transition metal complex such as ruthenium, a metal such as phthalocyanine or porphyrin, or a non-metal may be used for the sensitizing dye, for example.

The red color filter layers 13R, the green color filter layers 13G, and the blue color filter layers 13B are part of the dye-sensitized solar cell layer 20. In other words, the color filter layers 13R, 13G, and 13B include sensitizing dye adsorption layers 23R, 23G, and 23B corresponding to each color and are arranged together with the electrolyte layer 24 between the positive electrode 21 and the negative electrode 22.

More specifically, the red color filter layers 13R include red sensitizing dye adsorption layers 23R that contain a red sensitizing dye. The green color filter layers 13G include green sensitizing dye adsorption layers 23G that contain a green sensitizing dye. The blue color filter layers 13B include blue sensitizing dye adsorption layers 23B that contain a blue sensitizing dye.

The electrolyte layer 24 is made from an electrolyte that contains iodine ($I_2$), for example. A solid electrolyte or an electrolyte solution may be used for the electrolyte, for example. Examples of solid electrolytes include organic polymer gels that have a macromonomer structure, for example.

An electrolyte solution in which a crosslinked precursor is mixed may also be used for the electrolyte. A crosslinked precursor is a compound that, when mixed in an electrolyte solution that contains a redox material, is not reactive at normal temperatures but reacts to form cross-links when heated. In the crosslinked precursor, one of the crosslinking agents that react with one another is phase-separated from the electrolyte solution or dispersed in the electrolyte solution in another phase in order to improve stability at normal temperatures.

For the crosslinked precursor, a compound that contains inorganic particles and an organic substance that reacts with the surfaces of the inorganic particles when heated can be used, or a compound that contains at least two types of organic substances that react when heated can be used.

Nanosized silica can be used for the inorganic particles, for example. Alternatively, a material such as titania, zinc oxide, tin oxide, or alumina may be used for the inorganic particles. Furthermore, the surfaces of the inorganic particles may be covered with a basic compound such as pyridine that contains organic groups and reacts with carboxylic acids, for example.

For the inorganic particles and the organic substance that reacts with the surfaces of the inorganic particles when heated, a high molecular weight dicarboxylic acid (HOOC$(CH_2)_n$COOH, where n=10-50), a monocarboxylic acid polymer, or another type of carboxylic acid may be used. More specifically, examples of organic substances that can be used include: hexadecanedioic acid (HDDA), dodecanedioic acid (DDA), docosanedioic acid, dodecanecarboxylic acid, undecanedicarboxylic acid, undecanedioic acid, sebacic acid, azelaic acid, pimelic acid, oxalic acid, poly(oligo)acrylic acid and copolymers thereof, benzophenonetetracarboxylic acid, diphenylsulfonetetracarboxylic acid, benzophenonetricarboxylic acid, and benzophenonedicarboxylic acid.

In a compound that contains at least two type of organic substances that react when heated, one of the abovementioned carboxylic acids may be used for one of the organic substances. For the other organic substance, a nitrogen-containing compound that reacts with carboxylic acids such as polyvinylpyridine, polyvinylimidazole, or a compound that contains at least two pyridines and imidazoles in each molecule can be used, for example.

A compound that contains a combination of iodide ions and iodine can be used for the redox material. More specifically, a compound that contains a combination of a metal iodide and iodine such as LiI, NaI, or $CaI_2$ can be used for the redox material. Other combinations that can be used for the redox material include bromide ions and bromine, $Tl^{3+}$ thallium ions and Tl+ thallium ions, and Hg²⁺ mercury ions and Hg⁺ mercury ions, for example.

On the surface of the opposite substrate 3 that faces the liquid crystal layer 4, a light shielding layer 14 is formed. The light shielding layer 14 blocks light between adjacent color filter layers 13R, 13G, and 13B and is formed in a region (a light-shielding region) other than the abovementioned pixel regions.

Like the color filter layers 13R, 13G, and 13B, the light shielding layer 14 is part of the dye-sensitized solar cell layer 20. In other words, the light shielding layer 14 includes black sensitizing dye adsorption layers 23K that are arranged together with the electrolyte layer 24 between the positive electrode 21 and the negative electrode 22. The black sensitizing dye adsorption layers 23K contain a light-shielding sensitizing dye and are arranged between adjacent sensitizing dye adsorption layers 23R, 23G, and 23B.

In the color filter substrate of the present embodiment, the color filter layers 13R, 13G, and 13B include both the sensitizing dye adsorption layers 23R, 23G, and 23B corresponding to each color as well as the coloring material layers 25R, 25G, and 25B that transmit different wavelength components of light than the sensitizing dye adsorption layers 23R, 23G, and 23B.

The coloring material layers 25R, 25G, and 25B adjust the colors of light transmitted by the color filter layers 13R, 13G, and 13B and are arranged together with the respective sensitizing dye adsorption layers 23R, 23G, and 23B within the respective color filter layers 13R, 13G, and 13B.

More specifically, the red color filter layers 13R each include a red sensitizing dye adsorption layer 23R and a red coloring material layer 25R. The green color filter layers 13G each include a green sensitizing dye adsorption layer 23G and a green coloring material layer 25G. The blue color filter layers 13B each include a blue sensitizing dye adsorption layer 23B and a blue coloring material layer 25B.

The red coloring material layers 25R, the green coloring material layers 25G, and the blue coloring material layers 25B contain coloring materials corresponding to each color. Pigments, dyes, or the like used in conventional color filter layers may be used for these coloring materials.

Figure 4A:
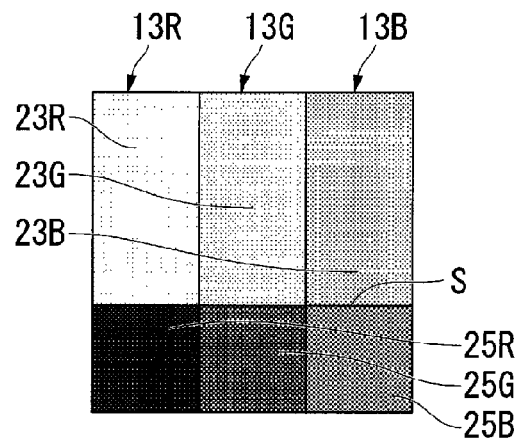
FIG. 4A is a first plan view illustrating an example of a configuration of sensitizing dye adsorption layers and coloring material layers in color filter layers.
Figure 4B:
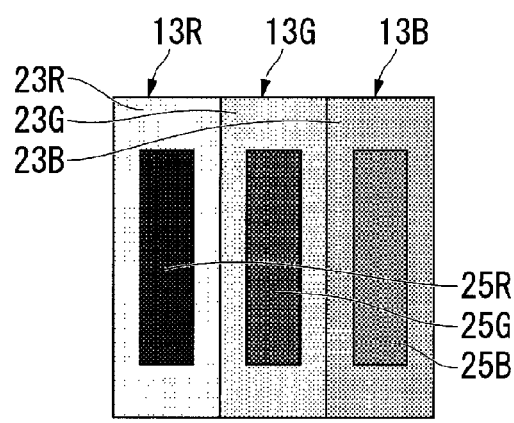
FIG. 4B is a second plan view illustrating an example of a configuration of sensitizing dye adsorption layers and coloring material layers in color filter layers.
Figure 4C:
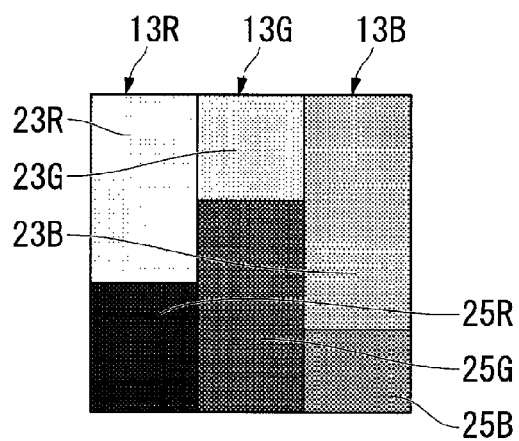
FIG. 4C is a third plan view illustrating an example of a configuration of sensitizing dye adsorption layers and coloring material layers in color filter layers.

The arrangement of the red coloring material layers 25R, green coloring material layers 25G, and blue coloring material layers 25B within the color filter layers 13R, 13G, and 13B is not particularly limited, and configurations such as those illustrated in FIGS. 4A to 4C may be used, for example. FIGS. 4A to 4C are plan views illustrating examples of the arrangement of the sensitizing dye adsorption layers 23R, 23G, and 23B and the coloring material layers 25R, 25G, and 25B in the respective color filters 13R, 13G, and 13B.

More specifically, in the color filter substrate illustrated in FIG. 4A, the color filter layers 13R, 13G, and 13B are divided into two regions by a dividing line S. In one region, the sensitizing dye adsorption layers 23R, 23G, and 23B are arranged, and in the other region, the coloring material layers 25R, 25G, and 25B are arranged. Moreover, the direction in which the dividing line S divides the pixel region is not limited to the configuration illustrated in FIG. 4A, in which the dividing line S divides the color filter layers 13R, 13G, and 13B horizontally. The dividing line S may also divide the color filter layers 13R, 13G, and 13B vertically or in a slanted direction.

In the color filter substrate illustrated in FIG. 4B, the coloring material layers 25R, 25G, and 25B are arranged in inner regions inside the color filter layers 13R, 13G, and 13B, and the sensitizing dye adsorption layers 23R, 23G, and 23B are arranged in outer regions inside the color filter layers 13R, 13G, and 13B. Furthermore, the color filter substrate is not limited to this configuration. The sensitizing dye adsorption layers 23R, 23G, and 23B may be arranged in the inner regions inside the color filter layers 13R, 13G, and 13B, and the coloring material layers 25R, 25G, and 25B may be arranged in the outer regions inside the color filter layers 13R, 13G, and 13B.

In the color filter substrate illustrated in FIG. 4C, each of the color filter layers 13R, 13G, and 13B are divided into a region in which the respective sensitizing dye adsorption layer 23R, 23G, or 23B is arranged and a region in which the respective coloring material layer 25R, 25G, or 25B is arranged, and the ratio of the sensitizing dye adsorption layer region to the coloring material layer region is different for each of the color filter layers 13R, 13G, and 13B.

In consideration of the fact that the sensitivity of the human eye to color satisfies the relationship green>red>blue, in the color filter substrate of the present embodiment the ratios of the coloring material layer regions are set to satisfy the relationship green coloring material layer 25G<red coloring material layer 25R<blue coloring material layer 25B. In this way, the ratios of the regions in which the sensitizing dye adsorption layers 23R, 23G, and 23B are arranged to the regions in which the coloring material layers 25R, 25G, and 25B are arranged within the color filter layers 13R, 13G, and 13B may be adjusted as appropriate.

In the liquid crystal display device 1A configured as described above, white illumination light WL emitted from the backlight 200 enters the liquid crystal display panel 100A from the device substrate 2 side. Furthermore, red light RL, green light GL, and blue light BL are emitted from the opposite substrate 3 side of the liquid crystal display panel 100A, thereby making it possible to display color images.

Of the illumination light WL that enters the liquid crystal display panel 100A, the red light RL emitted from the liquid crystal display panel 100A is transmitted by the red color filter layers 13R. The red color filter layers 13R transmit the red wavelength components of the illumination light WL and absorb the other green and blue wavelength components.

The green light GL emitted from the liquid crystal display panel 100A is transmitted by the green color filter layers 13G. The green color filter layers 13G transmit the green wavelength components of the illumination light WL and absorb the other red and blue wavelength components.

The blue light BL emitted from the liquid crystal display panel 100A is transmitted by the blue color filter layers 13B. The blue color filter layers 13B transmit the blue wavelength components of the illumination light WL and absorb the other red and green wavelength components.

The light shielding layer 14 does not transmit any of the illumination light WL and absorbs all of the wavelength components contained therein.

In the liquid crystal display device 1A, the dye-sensitized solar cell layer 20 is configured to include the color filter layer 13 and the light shielding layer 14 in order to make use of the illumination light WL that is not used to display images and is absorbed. In other words, in the liquid crystal display device 1A, the dye-sensitized solar cell layer 20 converts the illumination light WL absorbed by the color filter layer 13 and the light shielding layer 14 into electrical power and makes it possible to supply this power to the power supply circuit of the backlight 200 and to the battery 300. This makes it possible to increase the utilization efficiency of the illumination light WL while also reducing the power consumption of the liquid crystal display device 1A.

In the color filter substrate of the present embodiment, the color filter layers 13R, 13G, and 13B include both the sensitizing dye adsorption layers 23R, 23G, and 23B corresponding to each color as well as the coloring material layers 25R, 25G, and 25B. Therefore, the light emitted from the color filter layers 13R, 13G, and 13B contains a combination of light transmitted by the sensitizing dye adsorption layers 23R, 23G, and 23B and light transmitted by the coloring material layers 25R, 25G, and 25B.

In conventional technologies, using color filter layers that include only sensitizing dye adsorption layers makes it difficult to adjust the colors of light transmitted by the color filter layers. In contrast, in the present embodiment, the color filter layers 13R, 13G, and 13B include both the sensitizing dye adsorption layers 23R, 23G, and 23B as well as the coloring material layers 25R, 25G, and 25B, and the color of the light transmitted by the color filter layers 13R, 13G, and 13B can be adjusted using the coloring material layers 25R, 25G, and 25B.

To adjust the color of the light transmitted by the color filter layers 13R, 13G, and 13B, the coloring materials contained in the coloring material layers 25R, 25G, and 25B may be adjusted, or the ratios of the regions in which the sensitizing dye adsorption layers 23R, 23G, and 23B are arranged to the regions in which the coloring material layers 25R, 25G, and 25B are arranged within the color filter layers 13R, 13G, and 13B may be adjusted. This makes it possible to adjust finely the colors of the color filter layers 13R, 13G, and 13B, thereby making it possible to optimize the colors of light transmitted by the color filter layers 13R, 13G, and 13B.

Figure 5:
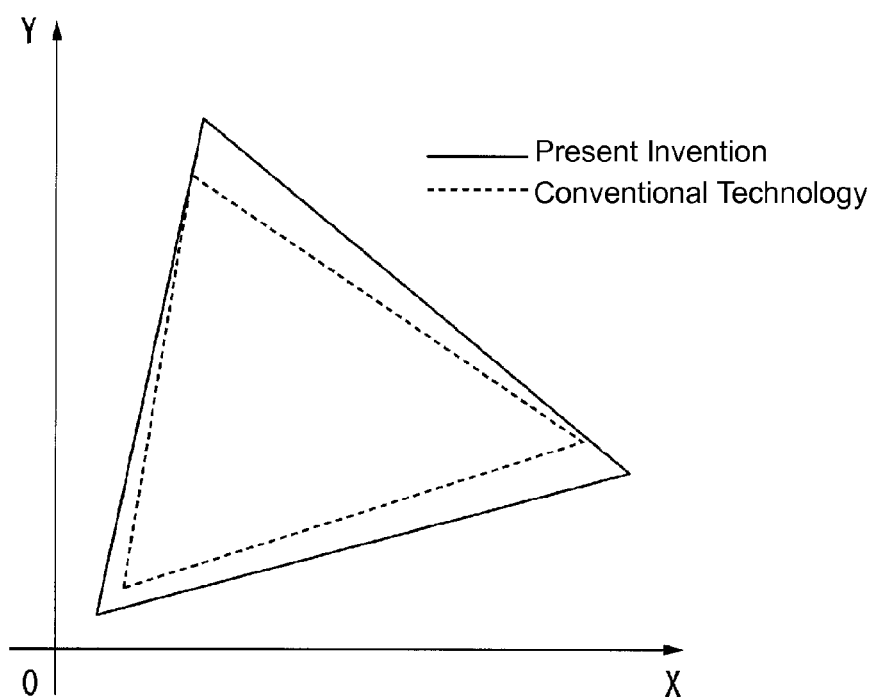
FIG. 5 is a chromaticity diagram illustrating a color reproduction range of color filter layers that include both sensitizing dye adsorption layers and coloring material layers and a color reproduction range of color filter layers that include only sensitizing dye adsorption layers.

FIG. 5 is a chromaticity diagram. In the diagram, the solid lines indicate the color reproduction range, in an XY chromaticity coordinate space, of a configuration in which the color filter layers 13R, 13G, and 13B include both the sensitizing dye adsorption layers 23R, 23G, and 23B as well as the coloring material layers 25R, 25G, and 25B (as in the present invention). The dashed lines indicate the color reproduction range, in the XY chromaticity coordinate space, of a configuration in which the color filter layers include only sensitizing dye adsorption layers (as in conventional technologies).

As illustrated in FIG. 5, the configuration in which the color filter layers 13R, 13G, and 13B include both the sensitizing dye adsorption layers 23R, 23G, and 23B as well as the coloring material layers 25R, 25G, and 25B exhibits a larger color reproduction range than the configuration in which the color filter layers include only the sensitizing dye adsorption layers.

As described above, in the liquid crystal display panel 100A, the color reproduction of color filter layers 13R, 13G, and 13B that include the dye-sensitized solar cell layer 20 can be improved. Therefore, in the liquid crystal display device 1A, which is equipped with the liquid crystal display panel 100A, images can be displayed with excellent color reproduction while simultaneously reducing power consumption.

<Embodiment 2>

Figure 6:
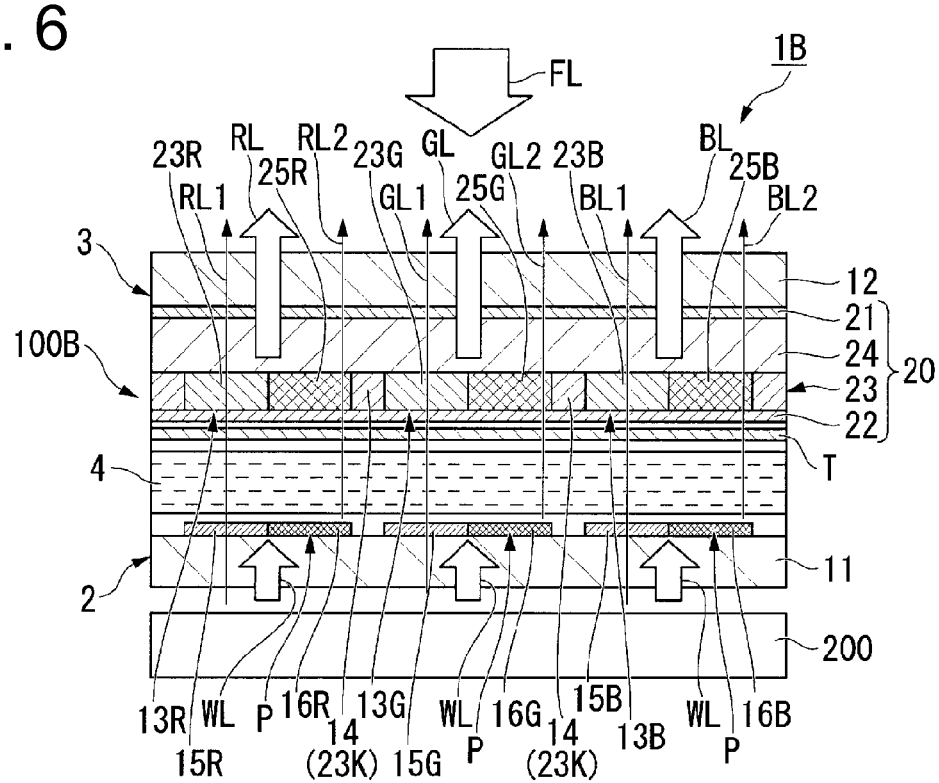
FIG. 6 is a cross-sectional view schematically illustrating a configuration of a liquid crystal display panel and a liquid crystal display device according to Embodiment 2 of the present invention.

FIG. 6 is a cross-sectional view schematically illustrating a configuration of a liquid crystal display device 1B according to Embodiment 2 of the present invention. Note that in the following description, the same reference characters are used for components that are the same as components in the liquid crystal display device 1A and the liquid crystal display panel 100A, and descriptions of those components are omitted.

The liquid crystal display device 1B is substantially identical to the liquid crystal display device 1A except in that the liquid crystal display device 1B includes a transflective liquid crystal display panel 100B as illustrated in FIG. 6 in place of the liquid crystal display panel 100A. Moreover, in the liquid crystal display panel 100B, the pixel electrodes P include transmissive portions 15R, 15G, and 15B and reflective portions 16R, 16G, and 16B. The rest of the configuration is substantially identical to the configuration of the liquid crystal display panel 100A.

The transmissive portions 15R, 15G, and 15B of the pixel electrodes P transmit light such as the illumination light WL that enters from the device substrate 2 side. The transmissive portions 15R, 15G, and 15G are made from a transparent conductive material such as ITO or IZO, for example.

The reflective portions 16R, 16G, and 16B of the pixel electrodes P reflect light such as external light FL that enters from the opposite substrate 3 side. The reflective portions 16R, 16G, and 16B are made from a metal material such as Al or Ag or an alloy thereof, for example. The reflective portions 16R, 16G, and 16B may also be formed by forming reflective films on the transparent electrodes that form the pixel electrodes P.

In the color filter layers 13R, 13G, and 13B, one of either the sensitizing dye adsorption layers 23R, 23G, and 23B or the coloring material layers 25R, 25G, and 25B are formed in regions (transmissive regions) that overlap with the transmissive portions 15R, 15G, and 15B when viewed in a plan view, and the other of either the sensitizing dye adsorption layers 23R, 23G, and 23B or the coloring material layers 25R, 25G, and 25B are formed in regions (reflective regions) that overlap with the reflective portions 16R, 16G, and 16B when viewed in a plan view.

More specifically, in the present embodiment, the red sensitizing dye adsorption layers 23R are formed in the transmissive regions that overlap with the red transmissive portions 15R when viewed in a plan view, and the red coloring material layers 25R are formed in the reflective regions that overlap with the red reflective portions 16R when viewed in a plan view. Similarly, the green sensitizing dye adsorption layers 23G are formed in the transmissive regions that overlap with the green transmissive portions 15G when viewed in a plan view, and the green coloring material layers 25G are formed in the reflective regions that overlap with the green reflective portions 16G when viewed in a plan view. Furthermore, the blue sensitizing dye adsorption layers 23B are formed in the transmissive regions that overlap with the blue transmissive portions 15B when viewed in a plan view, and the blue coloring material layers 25B are formed in the reflective regions that overlap with the blue reflective portions 16B when viewed in a plan view.

In the liquid crystal display device 1B configured as described above, images can be displayed on the liquid crystal display panel 100B in a transmissive mode when the device is in a dark place by turning on the backlight 200 and using the illumination light WL that enters from the device substrate 2 side. Conversely, images can be displayed on the liquid crystal display panel 100B in a reflective mode when the device is in a bright place by turning off the backlight 200 and using the external light FL that enters from the opposite substrate 3 side.

The red light RL emitted from the liquid crystal display panel 100B includes red transmitted light RL1 transmitted by the red transmissive portions 15R when the device is in transmissive mode and red reflected light RL2 reflected by the red reflective portions 16R when the device is in reflective mode. Of this red light RL, the red transmitted light RL1 passes through the red sensitizing dye adsorption layers 23R once. Meanwhile, the red reflected light RL2 passes through the red coloring material layers 25R twice.

The green light BL emitted from the liquid crystal display panel 100B includes green transmitted light GL1 transmitted by the green transmissive portions 15G when the device is in transmissive mode and green reflected light GL2 reflected by the green reflective portions 16G when the device is in reflective mode. Of this green light GL, the green transmitted light GL1 passes through the green sensitizing dye adsorption layers 23G once. Meanwhile, the green reflected light GL2 passes through the green coloring material layers 25G twice.

The blue light BL emitted from the liquid crystal display panel 100B includes blue transmitted light BL1 transmitted by the blue transmissive portions 15B when the device is in transmissive mode and blue reflected light BL2 reflected by the blue reflective portions 16B when the device is in reflective mode. Of this blue light BL, the blue transmitted light BL1 passes through the blue sensitizing dye adsorption layers 23B once. Meanwhile, the blue reflected light BL2 passes through the blue coloring material layers 25B twice.

Therefore, the light emitted from the liquid crystal display panel 100B takes the colors resulting from passing through the sensitizing dye adsorption layers 23R, 23G, and 23B once when the device is in the transmissive mode and the colors resulting from passing through the coloring material layers 25R, 25G, and 25B twice when the device is in the reflective mode. As a result of this, conventional transflective liquid crystal display panels are prone to emitting light that exhibits more differences in color depending on the display mode.

In contrast, in the liquid crystal display panel 100B of the present embodiment, the sensitizing dye adsorption layers 23R, 23G, and 23B and the coloring material layers 25R, 25G, and 25B are aligned with the transmissive portions 15R, 15G, and 15B and the reflective portions 16R, 16B, and 16G, respectively, thereby reducing color differences between the transmissive mode and the reflective mode.

In other words, in the liquid crystal display panel 100B, the color filter layers 13R, 13G, and 13B include both the sensitizing dye adsorption layers 23R, 23G, and 23B as well as the coloring material layers 25R, 25G, and 25B, thereby making it possible to adjust the colors of the light transmitted by the transmissive portions 15R, 15G, and 15B as well the colors of the light reflected by the reflective portions 16R, 16G, and 16B. This, in turn, makes it possible optimize the colors of the light emitted from the liquid crystal display panel 100B of the liquid crystal display device 1B both in transmissive mode and in reflective mode.

Note that the transflective liquid crystal display panel 100B is not necessarily limited to the configuration above, in which the sensitizing dye adsorption layers 23R, 23G, and 23B are formed in the transmissive regions that overlap with the transmissive portions 15R, 15G, and 15B when viewed in a plan view and in which the coloring material layers 25R, 25G, and 25B are formed in the reflective regions that overlap with the reflective portions 16R, 16G, and 16B when viewed in a plan view. For example, the coloring material layers 25R, 25G, and 25B may be formed in the transmissive regions that overlap with the transmissive portions 15R, 15G, and 15B when viewed in a plan view, and the sensitizing dye adsorption layers 23R, 23G, and 23B may be formed in the reflective regions that overlap with the reflective portions 16R, 16G, and 16B when viewed in a plan view.

In addition, both the sensitizing dye adsorption layers 23R, 23G, and 23B as well as the coloring material layers 25R, 25G, and 25B may be formed in the transmissive regions that overlap with the transmissive portions 15R, 15G, and 15B when viewed in a plan view. Furthermore, both the sensitizing dye adsorption layers 23R, 23G, and 23B as well as the coloring material layers 25R, 25G, and 25B may be formed in the reflective regions that overlap with the reflective portions 16R, 16G, and 16B when viewed in a plan view.

In this case, the colors of the light emitted from the color filter layers 13R, 13G, and 13B can be optimized for both transmissive mode and reflective mode by modifying the coloring materials used in the coloring material layers 25R, 25G, and 25B or by adjusting the ratios of the regions in which the sensitizing dye adsorption layers 23R, 23G, and 23B are arranged to the regions in which the coloring material layers 25R, 25G, and 25B are arranged in the transmissive regions and the reflective regions.

Moreover, using a transflective liquid crystal display panel 100B in the liquid crystal display device 1B makes it possible to convert both illumination light WL that enters from the device substrate 2 side and external light FL that enters from the opposite substrate 3 side into electrical power using the dye-sensitized solar cell layer 20.

In the liquid crystal display device 1B, this electrical power can be supplied to the backlight 200 and to the battery 300, thereby making it possible to further reduce power consumption.

As described above, in the liquid crystal display panel 100B, the color reproduction of color filter layers 13R, 13G, and 13B that include the dye-sensitized solar cell layer 20 can be improved. Therefore, in the liquid crystal display device 1B, which is equipped with the liquid crystal display panel 100B, images can be displayed with excellent color reproduction while simultaneously reducing power consumption.

<Embodiment 3>

Figure 7:
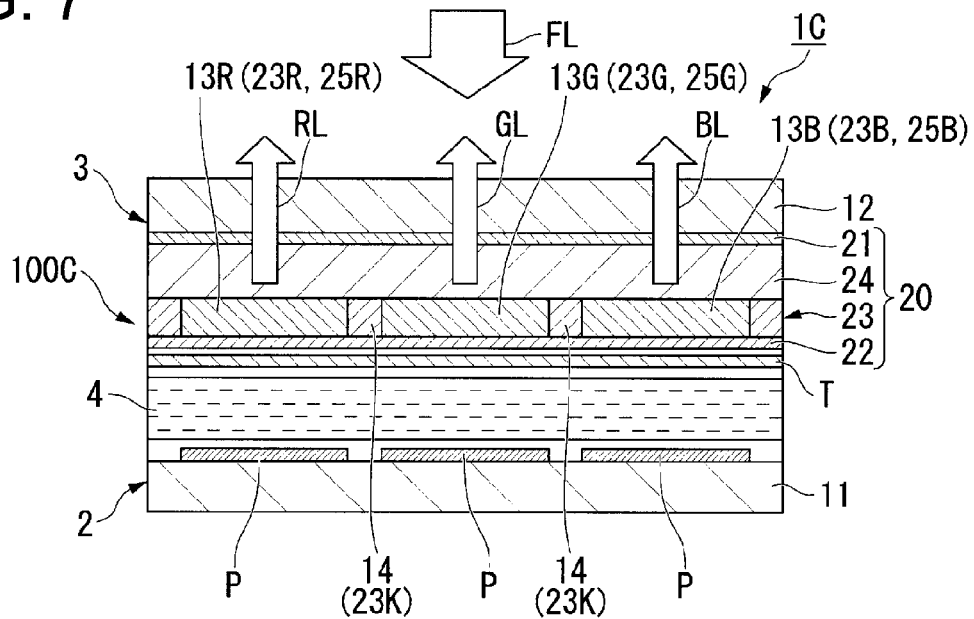
FIG. 7 is a cross-sectional view schematically illustrating a configuration of a liquid crystal display panel and a liquid crystal display device according to Embodiment 3 of the present invention.

FIG. 7 is a cross-sectional view schematically illustrating a configuration of a liquid crystal display device 1C according to Embodiment 3 of the present invention. Note that in the following description, the same reference characters are used for components that are the same as components in the liquid crystal display device 1A and the liquid crystal display panel 100A, and descriptions of those components are omitted.

The liquid crystal display device 1C includes a reflective liquid crystal display panel 100C as illustrated in FIG. 7 in place of the liquid crystal display panel 100A. In addition, the liquid crystal display panel 100C does not include the backlight 200. The rest of the configuration is substantially identical to the configuration of the liquid crystal display device 1A.

The liquid crystal display panel 100C is substantially identical to the liquid crystal display panel 100A except in that the pixel electrodes P are reflective electrodes. These reflective electrodes are made from a metal material such as Al or Ag or an alloy thereof, for example. Moreover, in the reflective liquid crystal display panel 100C, the device substrate 2 is not limited to the abovementioned transparent substrate 11, and a substrate that does not allow light to pass through such as a silicon substrate may be used, for example.

In the liquid crystal display device 1C configured as described above, the liquid crystal display panel 100C can display color images using the external light FL that enters from the opposite substrate 3 side.

Of the external light FL that enters the liquid crystal display panel 100C, the red light RL that is eventually emitted from the liquid crystal display panel 100C first passes through the red color filter layers 13R, is reflected by the pixel electrodes (reflective electrodes) P, and then passes through the red color filter layers 13R again. The red color filter layers 13R transmit the red wavelength components of the external light FL and absorb the other green and blue wavelength components.

The green light GL that is eventually emitted from the liquid crystal display panel 100C first passes through the green color filter layers 13G, is reflected by the pixel electrodes (reflective electrodes) P, and then passes through the green color filter layers 13G again. The green color filter layers 13G transmit the green wavelength components of the external light FL and absorb the other red and blue wavelength components.

The blue light BL that is eventually emitted from the liquid crystal display panel 100C first passes through the blue color filter layers 13B, is reflected by the pixel electrodes (reflective electrodes) P, and then passes through the blue color filter layers 13B again. The blue color filter layers 13B transmit the blue wavelength components of the external light FL and absorb the other red and green wavelength components.

The light shielding layer 14 does not transmit any of the external light FL and absorbs all of the wavelength components contained in that external light FL.

In the liquid crystal display device 1C, the dye-sensitized solar cell layer 20 is configured to include the color filter layers 13R, 13G, and 13B and the light shielding layer 14 in order to make use of the external light FL that is not used to display images and is absorbed. In other words, in the liquid crystal display device 1C, the dye-sensitized solar cell layer 20 converts the external light FL absorbed by the color filter layers 13R, 13G, and 13B and the light shielding layer 14 into electrical power and makes it possible to supply this power to the battery 300. This makes it possible to increase the utilization efficiency of the external light FL while also reducing the power consumption of the liquid crystal display device 1C.

Furthermore, in the liquid crystal display panel 100C, the color filter layers 13R, 13G, and 13B include both sensitizing dye adsorption layers 23R, 23G, and 23B as well as coloring material layers 25R, 25G, and 25B. Therefore, the light emitted from the color filter layers 13R, 13G, and 13B contains a combination of light transmitted by the sensitizing dye adsorption layers 23R, 23G, and 23B and light transmitted by the coloring material layers 25R, 25G, and 25B.

As described above, the color filter layers 13R, 13G, and 13B include both the sensitizing dye adsorption layers 23R, 23G, and 23B as well as the coloring material layers 25R, 25G, and 25B. This makes it possible to adjust finely the colors of the color filter layers 13R, 13G, and 13B and to optimize the colors of the light transmitted thereby.

As described above, in the liquid crystal display panel 100C, the color reproduction of color filter layers 13R, 13G, and 13B that include the dye-sensitized solar cell layer 20 can be improved. Therefore, in the liquid crystal display device 1C, which is equipped with the liquid crystal display panel 100C, images can be displayed with excellent color reproduction while simultaneously reducing power consumption.

<Embodiment 4>

Figure 8:
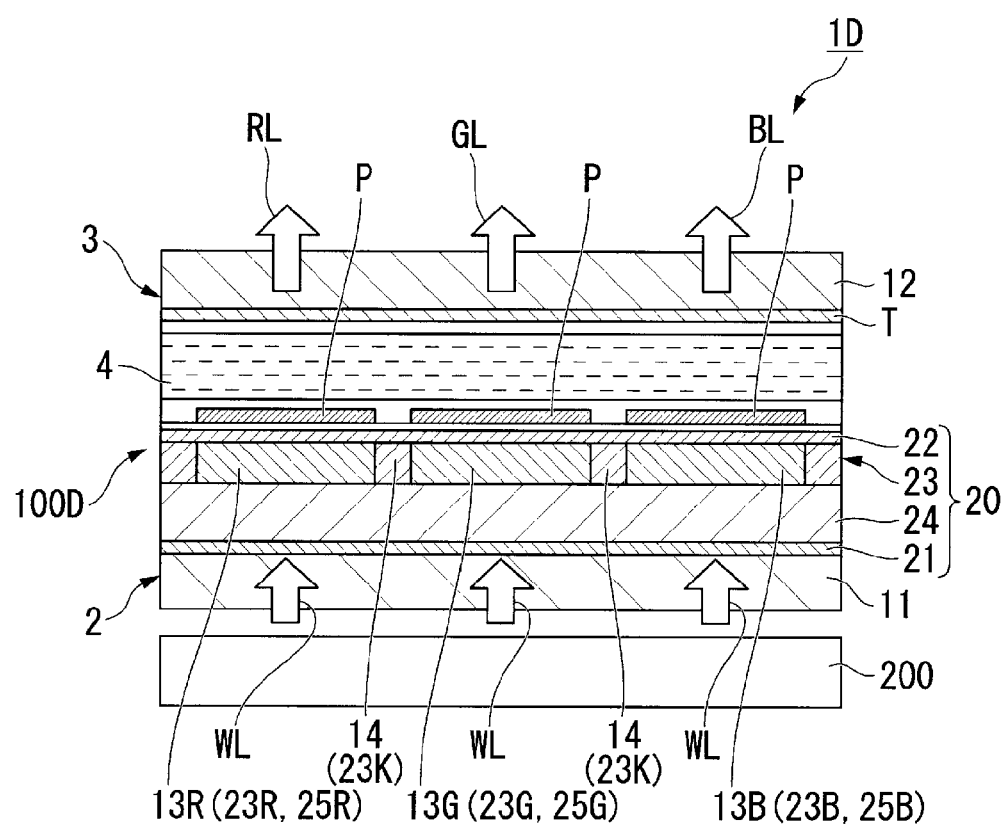
FIG. 8 is a cross-sectional view schematically illustrating a configuration of a liquid crystal display panel and a liquid crystal display device according to Embodiment 4 of the present invention.

FIG. 8 is a cross-sectional view schematically illustrating a configuration of a liquid crystal display device 1D according to Embodiment 4 of the present invention. Note that in the following description, the same reference characters are used for components that are the same as components in the liquid crystal display device 1A and the liquid crystal display panel 100A, and descriptions of those components are omitted.

The liquid crystal display device 1D is substantially identical to the liquid crystal display device 1A except in that the liquid crystal display device 1D includes a transmissive liquid crystal display panel 100D as illustrated in FIG. 8 in place of the liquid crystal display panel 100A. In the liquid crystal display panel 100D, the device substrate 2 corresponds to the color filter substrate of the present invention.

In addition, the color filter layers 13R, 13G, and 13B and the light shielding layer 14 of the dye-sensitized solar cell layer 20 are moved from the surface of the opposite substrate 3 that faces the liquid crystal layer 4 to the surface of the device substrate 2 that faces the liquid crystal layer 4.

More specifically, the color filter layers 13R, 13G, and 13B and the light shielding layer 14 are arranged between the transparent substrate 11 and the pixel electrodes P. Furthermore, the dye-sensitized solar cell layer 20 includes a positive electrode 21, an electrolyte layer 24, a sensitizing dye adsorption layer 23, and a negative electrode 22 layered in that order starting from the transparent substrate 11 side. The rest of the configuration is substantially identical to the configuration of the liquid crystal display panel 100A.

In the liquid crystal display device 1D configured as described above, white illumination light WL emitted from the backlight 200 enters the liquid crystal display panel 100D from the device substrate 2 side. Furthermore, red light RL, green light GL, and blue light BL are emitted from the opposite substrate 3 side of the liquid crystal display panel 100D, thereby making it possible to display color images.

Of the illumination light WL that enters the liquid crystal display panel 100D, the red light RL emitted from the liquid crystal display panel 100D is transmitted by the red color filter layers 13R. The red color filter layers 13R transmit the red wavelength components of the illumination light WL and absorb the other green and blue wavelength components.

The green light GL emitted from the liquid crystal display panel 100D is transmitted by the green color filter layers 13G. The green color filter layers 13G transmit the green wavelength components of the illumination light WL and absorb the other red and blue wavelength components.

The blue light BL emitted from the liquid crystal display panel 100D is transmitted by the blue color filter layers 13B. The blue color filter layers 13B transmit the blue wavelength components of the illumination light WL and absorb the other red and green wavelength components.

The light shielding layer 14 does not transmit any of the illumination light WL and absorbs all of the wavelength components contained therein.

In the liquid crystal display device 1D, the dye-sensitized solar cell layer 20 is configured to include the color filter layers 13R, 13G, and 13B and the light shielding layer 14 in order to make use of the illumination light WL that is not used to display images and is absorbed. In other words, in the liquid crystal display device 1D, the dye-sensitized solar cell layer 20 converts the illumination light WL absorbed by the color filter layers 13R, 13G, and 13B and the light shielding layer 14 into electrical power and makes it possible to supply this power to the power supply circuit of the backlight 200 and to the battery 300. This makes it possible to increase the utilization efficiency of the illumination light WL while also reducing the power consumption of the liquid crystal display device 1D.

Furthermore, in the liquid crystal display panel 100D, the color filter layers 13R, 13G, and 13B include both sensitizing dye adsorption layers 23R, 23G, and 23B as well as coloring material layers 25R, 25G, and 25B. Therefore, the light emitted from the color filter layers 13R, 13G, and 13B contains a combination of light transmitted by the sensitizing dye adsorption layers 23R, 23G, and 23B and light transmitted by the coloring material layers 25R, 25G, and 25B.

As described above, the color filter layers 13R, 13G, and 13B include both the sensitizing dye adsorption layers 23R, 23G, and 23B as well as the coloring material layers 25R, 25G, and 25B. This makes it possible to adjust finely the colors of the color filter layer 13 and to optimize the colors of the light transmitted thereby.

As described above, in the liquid crystal display panel 100D, the color reproduction of color filter layers 13R, 13G, and 13B that include the dye-sensitized solar cell layer 20 can be improved. Therefore, in the liquid crystal display device 1D, which is equipped with the liquid crystal display panel 100D, images can be displayed with excellent color reproduction while simultaneously reducing power consumption.

When the color filter layer 13 is arranged on the device substrate 2 side, the abovementioned light shielding layer 14 can also be removed. The reason the light shielding layer 14 can be removed will be described in more detail with reference to FIGS. 9A to 9D.

FIGS. 9A to 9D illustrate the arrangement of one of the color filter layers 13 relative to one of the rectangular pixel regions P' formed by the source bus lines SL and the gate bus lines GL.

Figure 9A:
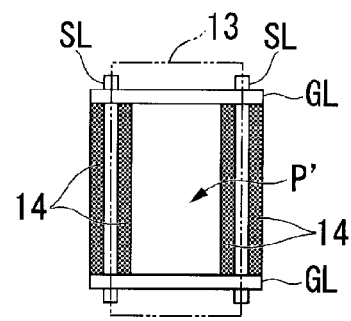
FIG. 9A is a first plan view illustrating a configuration of a color filter layer.
Figure 9B:
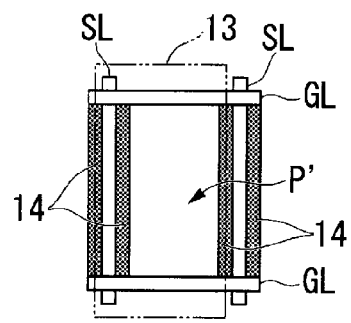
FIG. 9B is a second plan view illustrating a configuration of a color filter layer.
Figure 9C:
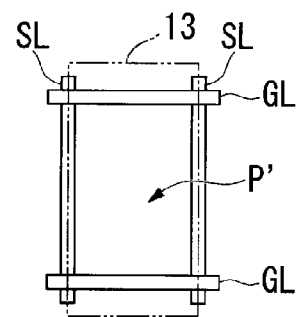
FIG. 9C is a third plan view illustrating a configuration of a color filter layer.
Figure 9D:
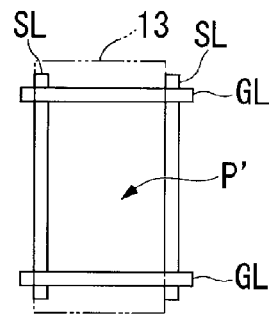
FIG. 9D is a fourth plan view illustrating a configuration of a color filter layer.

FIGS. 9A and 9B illustrate configurations in which the color filter layer 13 is arranged on the opposite substrate 3 side, and FIGS. 9C and 9D illustrate configurations in which the color filter layer 13 is arranged on the device substrate 2 side. Moreover, FIGS. 9A and 9C illustrate configurations in which the color filter layer 13 is not shifted relative to the pixel region P', and FIGS. 9B and 9D illustrate configurations in which the color filter layer 13 is shifted relative to the pixel region P'.

The light that passes through the color filter layer 13 first passes through the pixel electrodes P, and therefore the color filter layer 13 must be arranged to overlap with the pixel regions P' when viewed in a plan view so that light that passes through the pixel electrodes P does not leak into regions where the color filter layer 13 is not formed.

However, the alignment error when fixing the device substrate 2 and the opposite substrate 3 together may be relatively large, on the order of plus or minus several μm. As a result, when the color filter layer 13 is arranged on the opposite substrate 3 side, it is possible for the color filter layer 13 to be misaligned relative to the pixel regions P'.

Therefore, as illustrated in FIGS. 9A and 9B, when the color filter layer 13 is arranged on the opposite substrate 3 side, the light shielding layer 14 must also be formed to block light that would otherwise leak out. In this case, the pixel regions P' are narrowed by an amount equal to the regions where the light shielding layer 14 is formed, thereby decreasing the aperture ratio of the color filter layer 13.

In contrast, when the color filter layer 13 is provided on the device substrate 2 side, misalignment of the color filter layer 13 does not need to be taken into consideration when fixing the device substrate 2 and the opposite substrate 3 together. In addition, the alignment error of the color filter layer 13 relative to the pixel regions P' is relatively small, on the order of less than or equal to 1 μm in either direction.

Therefore, as illustrated in FIGS. 9C and 9D, when the color filter layer 13 is arranged on the device substrate 2 side, the light shielding layer 14 can be removed. This makes it possible to increase the aperture ratio of the color filter layer 13. This, in turn, makes it possible to increase the brightness of the light that passes through the color filter layer 13. Alternatively, if the brightness is kept at the same level, the power consumption can be reduced.

<Other Embodiments>

The present invention is not limited to Embodiments 1 to 4. Various modifications can be made without departing from the spirit of the present invention.

For example, in the embodiments described above, the electrical power generated by the dye-sensitized solar cell layer 20 is supplied to the power supply circuit of the backlight 200 and to the battery 300. In this case, the electrical power generated by the dye-sensitized solar cell layer 20 can be used to drive the backlight 200 or to charge the battery 300. The power stored in the battery 300 can then be used to drive the liquid crystal display panel 100A, the backlight 200, or the like.

Meanwhile, configurations in which the electrical power generated by the dye-sensitized solar cell layer 20 is supplied only to the power supply circuit of the backlight 200 or only to the battery 300 as well as configurations in which this power is supplied directly to the power supply circuit of the liquid crystal display panel 100A are also possible. The electrical power generated by the dye-sensitized solar cell layer 20 may also be used for a purpose other than those described above.

Furthermore, the liquid crystal display devices 1A to 1D described above are all driven by the battery 300; however, configurations in which the battery 300 is removed are also possible. In this case, the liquid crystal display devices 1A to 1D may be driven using electrical power supplied to the power supply circuit from an external power source such as a commercial power supply.

In addition, the liquid crystal display devices 1A to 1D may be direct-view liquid crystal display devices in which the viewer views images displayed directly on the liquid crystal display panels 100A to 100D or projection-type liquid crystal display devices in which light emitted from the liquid crystal display panels 100A to 100D is projected onto a screen to display images.

Moreover, the liquid crystal display panels 100A to 100D described above are configured to include a plurality of color filter layers 13 in different colors in order to display color images. However, the liquid crystal display panel is not limited to configurations that include the red (R), green (G), and blue (B) color filter layers 13R, 13G, and 13B. For example, the liquid crystal display panel may include color filter layers 13 in cyan (C), magenta (M), and yellow (Y) or another combination of RGB and CMY colors.

Furthermore, the opposite electrode T does not necessarily need to be included. The opposite electrode T may be removed depending on the display mode (driving scheme) employed in the liquid crystal display devices 1A to 1D. The opposite electrode T is necessary in display modes in which an electric field is applied to the liquid crystal layer 4 in the thickness direction thereof, such as twisted nematic (TN) mode, guest-host mode, and polymer dispersed liquid crystal (PDLC) mode, for example. In contrast, the opposite electrode T is not necessary in display modes in which an electric field is applied to the liquid crystal layer 4 in a direction parallel to the device substrate 2, such as in-plane switching (IPS) mode.

Moreover, the color filter substrate of the present invention is not limited to use in liquid crystal display panels and liquid crystal display devices such as those described above and may also be applied to self-luminescent display panels and image display devices that include light-emitting devices such as organic electroluminescent elements, for example.

INDUSTRIAL APPLICABILITY

The present invention is suitable for application to color filter substrates in which color filter layers made using dye-sensitized solar cells must exhibit improved color reproduction, as well as to liquid crystal display panels, liquid crystal display devices, and the like.

DESCRIPTION OF REFERENCE CHARACTERS 1 liquid crystal display device
100A to 100D liquid crystal display panel
200 backlight
300 battery
2 device substrate
3 opposite substrate
4 liquid crystal layer
11, 12 transparent substrate
13 color filter layer
13R red color filter layer
13G green color filter layer
13B blue color filter layer
14 light-shielding layer
15R, 15G, 15B transmissive portion
16R, 16G, 16B reflective portion
20 dye-sensitized solar cell layer
21 positive electrode
22 negative electrode
23 sensitizing dye adsorption layer
23R red sensitizing dye adsorption layer
23G green sensitizing dye adsorption layer
23B blue sensitizing dye adsorption layer
23K black sensitizing dye adsorption layer
24 electrolyte layer
25R red coloring material layer
25G green coloring material layer
25B blue coloring material layer
P pixel electrode
WL illumination light
RL red light
GL green light
BL blue light
FL external light

What is claimed is:

1. A color filter substrate, comprising:
   a substrate;
   a dye-sensitized solar cell disposed on the substrate; and
   a coloring material pattern disposed on the substrate in an area different from an area where the dye-sensitized solar cell is disposed,
   wherein the dye-sensitized solar cell includes a positive electrode and a negative electrode disposed facing one another, and a sensitizing dye adsorption layer and an electrolyte layer both formed between the positive electrode and the negative electrode,
   wherein the coloring material pattern transmits wavelength components of light that differ from wavelength components of light transmitted by the sensitizing dye adsorption layer,
   wherein a plurality of pixels are defined on the substrate, each pixel having the dye-sensitized solar cell and the coloring material pattern,
   wherein the plurality of pixels are grouped into a plurality of colored groups each assigned different colors, and
   wherein the wavelength components transmitted by the sensitizing dye adsorption layer in the dye-sensitized solar cell in each pixel differ each colored group, and the wavelength components transmitted by the coloring material pattern in each pixel differ for each colored group.

2. The color filter substrate according to claim 1, wherein a ratio of an area of the dye-sensitized solar cell to an area of the coloring material pattern in each pixel differs for each colored group.

3. The color filter substrate according to claim 1, wherein a portion of the sensitizing dye adsorption layer in the dye-sensitized solar cell in each of the pixels is dyed black to shield the respective pixels from light.

4. The color filter substrate according to claim 1, wherein the positive electrode and the negative electrode are transparent electrodes.

5. A liquid crystal display panel, comprising:
   a device substrate and an opposite substrate arranged facing one another; and
   a liquid crystal layer provided between the device substrate and the opposite substrate,
   wherein one of the device substrate and the opposite substrate is a color filter substrate that comprises:
   a substrate;
   a dye-sensitized solar cell disposed on the substrate; and
   a coloring material pattern disposed on the substrate in an area different from an area where the dye-sensitized solar cell is disposed,
   wherein the dye-sensitized solar cell includes a positive electrode and a negative electrode disposed facing one another, and a sensitizing dye adsorption layer and an electrolyte layer both formed between the positive electrode and the negative electrode, and
   wherein the coloring material pattern transmits wavelength components of light that differ from wavelength components of light transmitted by the sensitizing dye adsorption layer.

6. A liquid crystal display panel, comprising:
   a device substrate and an opposite substrate arranged facing one another; and
   a liquid crystal layer provided between the device substrate and the opposite substrate,
   wherein one of the device substrate and the opposite substrate is the color filter substrate according to claim 2,
   wherein a plurality of pixel electrodes are formed on a surface of the device substrate that faces the liquid crystal layer, and
   wherein the pixels are defined in the color filter substrate so as to overlap with the pixel electrodes, respectively, in a plan view.

7. The liquid crystal display panel according to claim 6, wherein the pixel electrodes are transparent electrodes.

8. The liquid crystal display panel according to claim 6, wherein the pixel electrodes are reflective electrodes.

9. The liquid crystal display panel according to claim 6, wherein each of the pixel electrodes has a transmissive portion and a reflective portion.

10. The liquid crystal display panel according to claim 9, wherein one of either the coloring material pattern or at least a portion of the sensitizing dye adsorption layer of the dye-sensitized solar cell is formed in a transmissive region that overlaps with the transmissive portion of the pixel electrode in a plan view, and the other of either the coloring material pattern or at least the portion of the sensitizing dye adsorption layer is formed in a reflective region that overlaps with the reflective portion of the pixel electrode in a plan view.

11. The liquid crystal display panel according to claim 9,
wherein each pixel has at least two of the coloring material patterns and at least two of the sensitizing dye adsorption layers,
wherein one of the coloring material patterns and at least a portion of one of the sensitizing dye adsorption layers are both formed in a transmissive region that overlaps with the transmissive portion of the pixel electrode in a plan view, and another of the coloring material patterns and at least a portion of another of the sensitizing dye adsorption layers are both formed in a reflective region that overlaps with the reflective portion of the pixel electrode in a plan view, and
wherein a ratio of a region in which the sensitizing dye adsorption layer of the dye-sensitized solar cell is formed to a region in which the coloring material pattern is formed in the transmissive regions is different than a ratio of a region in which the sensitizing dye adsorption pattern is formed to a region in which the coloring material pattern is formed in the reflective region.

12. A liquid crystal display device, comprising:
the liquid crystal display panel according to claim 5; and
a power source that supplies electrical power to the liquid crystal display panel,
wherein the dye-sensitized solar cell supplies electrical power to at least the power source.

13. A liquid crystal display device, comprising:
the liquid crystal display panel according to claim 5; and
a light source that irradiates the liquid crystal display panel with illumination light,
wherein the dye-sensitized solar cell supplies electrical power to at least the light source.

* * * * *